United States Patent
Nishi et al.

[11] Patent Number: 5,919,856
[45] Date of Patent: Jul. 6, 1999

[54] WATER-BASED COATING COMPOSITIONS AND COATING METHOD USING THE SAME

[75] Inventors: Tadahiko Nishi, Yahata; Takeshi Takagi, Kariya; Yoshitaka Okude, Hirakata, all of Japan

[73] Assignee: Nippon Paint Co., Ltd., Japan

[21] Appl. No.: 08/993,410

[22] Filed: Dec. 18, 1997

[30] Foreign Application Priority Data

Dec. 19, 1996 [JP] Japan ..................................... 8-354881

[51] Int. Cl.$^6$ ................................ C08J 3/00; C08K 3/20; C08L 51/00; B05D 3/02

[52] U.S. Cl. .......................... 524/539; 427/469; 427/470; 427/372.2; 427/385.5; 427/388.1; 427/388.2; 427/388.4; 524/591; 524/839; 524/840; 525/10; 525/28

[58] Field of Search ...................................... 524/539, 591, 524/839, 840; 525/10, 28; 427/469, 470, 372.2, 385.5, 388.1, 388.2, 388.4

[56] References Cited

U.S. PATENT DOCUMENTS 5,405,911   4/1995   Handlin, Jr. et al. .................... 525/139

*Primary Examiner*—Patrick D. Niland
*Attorney, Agent, or Firm*—Millen, White, Zelano, & Branigan, P.C.

[57] ABSTRACT

A water-based thermosetting coating composition comprises a polyester resin having a number of pendant carboxyl groups and a crosslinker for the resin both dispersed in an aqueous medium containing a neutralizing base. The polyester resin contains as polyester-forming polyhydric alcohol reactants from 1 to 40% by weight of the entire polyester-forming reactants of a polyalkadienediol or a hydrogenated products thereof and from 2 to 50% by weight of the entire polyester-forming reactants of a 2,2-bis(hydroxymethyl) alkanoic acid. The coating composition is useful for forming a multilayer coating film on metallic substrates such as automobile bodies by applying the coating composition as an intermediate coating layer between an electrodeposition coating layer and a top coating layer.

16 Claims, No Drawings

WATER-BASED COATING COMPOSITIONS AND COATING METHOD USING THE SAME

BACKGROUND OF THE INVENTION

1. Field of the Invention

This invention relates to a water-based, thermosetting polyester coating composition. More particularly, it relates to a polyester coating composition useful as an intermediate coating to be applied on an electrodeposition coating layer on a metallic substrate such as automobile bodies.

2. Background Art

Recently, from the standpoint of saving natural resources and energy and for environmental reasons, much interest has been placed on water-based coating compositions. It is common practice in automobile finish, for example, to apply an electrodeposition coating layer, an intermediate layer of primer or anti-chipping coating and a solid- or metallic color coating layer, successively. If a water-based paint is used as the intermediate coating, not only is it possible to avoid the use of organic solvents, but also the intermediate coating can be applied on the electrodeposition coating layer wet-on-wet and then baked the two layers simultaneously to reduce the number of steps.

Water-soluble or water-dispersible polyester resins including alkyd resins have been conventionally used for such intermediate coatings as the vehicle resin thereof. Known polyester resins of this kind have a problem that the solution viscosity thereof increases as the degree of neutralization with a base increases. Therefore, the solids content of paint compositions should be relatively low in order to achieve a viscosity level thereof suitable for application. This results in poor workability in terms of sagging and so on. Satisfactory workability could be achieved by lowering the degree of neutralization and thus the solution viscosity of the aqueous varnish of the polyester resin. This approach will not be successful because the storage stability of the resulting coating compositions would be significantly impaired. Another approach to formulate a high solids, storage-stable compositions yet retaining a viscosity level suitable for application is the use of a low molecular weight resin, particularly resins having a low weight average molecular weight. The use of low molecular weight resins should fail to impart coating films with a sufficient level of strength and other film performance although the workability and storage stability requirements could be met. Accordingly, what is required for such intermediate coating compositions is that they can be applied to a satisfactory film thickness without developing pinholes, craters, sagging and other film defects while, at the same time, achieving high film performance.

In an attempt to meet these requirements, JP-A-07/252449 corresponding to U.S. Pat. No. 5,597,861 assigned to the assignee of this application discloses a water-based coating composition comprising a polyester resin containing as a polyol component a polyalkadienediol or a hydrogenated product thereof.

Polyester resins to be used for water-based coating compositions must have a number of acid groups corresponding to an acid number of at least 10 mg KOH/g in order that the resin can be dissolved or dispersed in an aqueous medium containing a neutralizing base. One conventional method for introducing such acid groups to the resin molecule is the use of a polybasic carboxylic acid having 3 or more acid groups or an acid anhydride thereof as a portion of polycarboxylic acid component in the synthesis of a polyester chain having a number of pendant free acid groups originating from unreacted carboxylic group or groups in excess of two possessed by the polybasic carboxylic acid. This method increases not only the acid number but also to hydroxyl number of the resin and requires complicated procedure and conditions in the synthesis. Another known method couples a polycarboxyl acid residue having at least one free carboxyl group to a polyester chain through an ester linkage by reacting the corresponding polybasic carboxylic acid anhydride with terminal and/or pendant hydroxyl groups possessed by the starting polyester. This method is used in JP-A-07/252449 and U.S. Pat. No. 5,597,861 cited supra. The polybasic carboxylic acid residues coupled in this manner are not incorporated within the polyester chain backbone and thus they are susceptible to detaching from the polyester chain through hydrolysis of the ester linkage. As a result, the remaining polyester chain decreases in its hydrophilicity and exhibits decreased storge stability represented by increased viscosity or phase separation of coating compositions. The susceptibility to hydrolysis of the resin also decreases the water resistance of coating films thereof.

Therefore, it is an object of the present invention to provide a polyester resin for use in the production of water-based coating compositions particularly intermediate coating compositions to be used in finishing automobile bodies which have not only excellent workability and film performance required for such use but also high resistance to hydrolysis.

SUMMARY OF THE INVENTION

In order to accomplish the above and other objects, the present invention employs as a portion of polyester-forming polyhydric alcohol component a 2,2-bis(hydroxymethyl) alkanoic acid. Because this acid functions as a polyhydric alcohol component, it is incorporated into the polyester backbone chain upon the polycondensation reaction with a polycarboxylic acid component. Because the carboxyl group attached to the tertiary carbon atom of this acid exhibits a low relative reactivity, the acid group does not participate in the esterification reaction but remains as a free carboxylic acid form during the polycondensation reaction. Accordingly, a hydrolysis-resistant, hydrophilic polyester resin having a number of acid groups can be synthesized by incorporating an appropriate proportion of the above acid into the polyester chain.

Having this principle behind, the present invention provides a thermosetting, water-based coating composition comprising (a) a polyester resin having an acid number from 10 to 100, a hydroxyl number from 30 to 200 and a weight average molecular weight from 4,000 to 200,000 and containing a polyalkadienediol having an average degree of polymerization from 5 to 50, a hydrogenated product of said polyalkadienediol or a mixture thereof in a proportion from 1 to 40% by weight of the entire polyester-forming reactants, and a 2,2-bis(hydroxymethyl)alkanoic acid having 3 or more carbon atoms in the main chain in a proportion from 2 to 50% by weight of the entire polyester-forming reactants and (b) a crosslinker for the resin, said resin and said crosslinker being dispersed in an aqueous medium containing a neutralizing base.

The coating composition of the present invention may be applied on a metallic substrate such as automobile bodies as an intermediate coating layer to form a multilayer coating film comprising an electrically deposited subcoating layer, an intermediate coating layer and a top coating layer. The method comprises the steps of applying the water-based coating composition of the present invention onto said subcoating layer before or after baking said subcoating layer, baking the intermediate coating layer independently or simultaneously with said subcoating layer to form said intermediate layer, applying a pigmented base coating composition and optionally a clear coating composition onto said intermediate coating layer to form said top coating layer, and baking said top coating layer. The pigmented and clear coating compositions may be either of water-base type or solvent type. Preferably, the top coating layer is applied by applying the clear coating composition onto the base coating layer wet-on-wet and baking both layers simultaneously.

DETAILED DESCRIPTION OF THE INVENTION

As is well-known in the art, polyester resins are a polycondensate of a polybasic acid component and a polyhydric alcohol component. A small proportion of a monocarboxylic acid, a hydroxycarboxylic acid and/or a lactone may be incorporated to the acid and alcohol reactants. The reactants for producing alkyd resins additionally contain a drying oil or semi-drying oil or a fatty acid component thereof.

The polyester resin of the present invention may be synthesized by essentially the same method as disclosed in commonly assigned JP-A-07252449 and U.S. Pat. No. 5,597,861 except that the alcoholic component comprises a 2,2-bis(hydroxymethyl)alkanoic acid as a part thereof instead of introducing acid groups by the ring-opening reaction of an aromatic polybasic carboxylic acid anhydride with a hydroxyl group present in the polyester resin.

Examples of polycarboxylic acid reactants are an aromatic polycarboxylic acid or anhydride such as phthalic anhydride, isophthalic acid, terephthalic acid, trimellitic anhydride, tetrabromophthalic anhydride, tetrachlorophthalic anhydride or pyromellitic anhydride; an alicyclic polycarboxylic acid or anhydride such as hexahydrophthalic anhydride, tetrahydrophthalic acid, 1,4- or 1,3-cyclohexanedicarboxylic acid; and an aliphatic polycarboxylic acid or anhydride such as maleic anhydride, fumaric acid, succinic anhydride, adipic acid, sebacic acid or azelaic acid. The entire polyester-forming reactants preferably contain up to 50% by weight, more preferably from 5 to 45% by weight of an alicyclic polycarboxylic acid such as 1,4- or 1,3-cyclohexanedicarboxylic acid. As stated before, a small proportion of a monohydroxycarboxylic acid such as 4-hydroxybenzoic acid, hydroxypivalic acid or 12-hydroxystearic acid, and a monocarboxyl acid such as benzoic or t-butylbenzoic acid may be included in the acid component.

The polyester resin of the present invention contains from 1 to 40%, preferably from 3 to 30% of a hydroxy-terminated polyalkadienediol, a hydrogenated product of said polyalkadienediol or a mixture thereof in the polyester-forming reactants. These diols are derived from a conjugated alkadiene oligomer or polymer having a degree of polymerization from 5 to 50. The diol preferably has a number average molecular weight from 1,000 to 4,000, more preferably from 1,500 to 3,000. 1, 4-Polyisoprenediol, 1,4-or 1,2-polybutadienediol and a hydrogenated product thereof are preferable. A number of commercial products are available from various sources including a hydrogenated polyisoprenediol having a number average molecular weight (Mn) of 1,860 and an average degree of polymerization (D.P.) of 26 sold under the commercial name of EPOL, a polyisoprenediol having an Mn of 2,200 and an average D.P. of 34 sold under the commercial name of PIP, and a polybutadienediol having an Mn of 2,270 and an average D.P. of 42 sold under the commercial name of R-45HT, all being available from Idemitsu Petrochemical Co., Ltd., a hydrogenated polybutadienediol having an Mn of 2,200 and an average D.P. of 39 sold under the commercial name of POLYTEL HA, and a hydrogenated polybutadienediol having an Mn of 2,350 and an average D.P. of 42 sold under the commercial name of POLYTEL H; all being available from Mitsubishi Chemical Corporation. A high molecular weight polyester resin exhibiting a relatively low viscosity at a high degree of neutralization can be produced by the use of one of these diols as a portion of the polyhydric alcohol component. However, excessive use thereof will result in decreased water-dispersibility and also in decreased hardness of the cured film thereof.

The polyester resin of the present invention further contains, as described earlier, from 2 to 50%, preferably from 5 to 20% by weight of the entire polyester-forming reactants of a 2,2-bis(hydroxymethyl)alkanoic acid which constitutes part of the polyhydric alcohol reactant. The alkanoic acid should have at least 3 but no more than 18, preferably no more than 8 carbon atoms inclusive of the carbonyl carbon in the main chain. Specific examples thereof include 2,2-dimethylolpropionic acid, 2,2-dimethylolbutanoic acid, 2,2-dimethylolpentanoic acid, 2,2-dimethylolhexanoic acid and 2,2-dimethyloloctanoic acid. 2,2-Dimethylolpropionic acid or 2,2-diemthylolbutanoic acid is preferable. As will be appreciated from the preceding description, the resin acid number is proportional to the proportion of this alkanoic acid in the entire reactants. Accordingly, a desired acid number may be achieved in the resulting polyester resin by adjusting the proportion of this alkanoic acid appropriately.

The remainder of the polyol component is a nonpolymeric diol such as ethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanemethanol, neopentyl glycol hydroxypivalate, 2-butyl-2-ethyl-1,3-propanediol, 3-methyl-1,5-pentanediol, 2,2,4-trimethylpentanediol or hydrogenated bisphenol A; and a polyol having three or more hydroxyl groups such as trimethylolpropane, trimethylolethane, glycerine or pentaerythritol.

Alkyd resins of the present invention additionally contain up to 30%, preferably up to 25% and more preferably from 10 to 20% by weight of a fatty acid having 6 or more carbon atoms or an oil containing said fatty acid in the entire reactants. Examples of oils and fatty acids include castor oil, linseed oil, dehydrated castor oil, tung oil, safflower oil, soybean oil, tall oil, coconut oil, palm oil and their fatty acids. Coconut oil and palm oil are preferable.

Other reactants which may be optionally incorporated in the polyester resin of the present invention include a monoepoxide compound such as CARDULA E sold by Shell Chemical and a lactone. Lactones are addition reacted to the polyol polycarboxylate polyester chain to form a polyester chain by themselves. Examples of usable lactones for this purpose includes β-propiolactone, dimethylpropiolactone, butyrolactone, γ-valorolactone, ε-caprolactone, γ-caprolactone, γ-caprylolactone, crotolactone, δ-valerolactone and δ-caprolactone. ε-Caprolactone is preferable. The proportion of lactones in the entire reactants may be from 3 to 30%, preferably from 5 to 20%, more preferably from 7 to 15% by weight of the entire reactants. The addition of lactones is effective for improving the anti-chipping property of a multilayer coating film.

The polyester resin of the present invention may be synthesized using the conventional method by subjecting the above reactants to a condensation reaction at a temperature, for instance, between 150° C. and 250° C. for 4 to 10 hours in the nitrogen gas atmosphere. The reaction may be carried out, as is known in the art, in the presence of a catalyst such as dibutyltin oxide, antimony trioxide, zinc acetate, manganese acetate, cobalt acetate, calcium acetate, lead acetate, tetrabutyl titanate or tetraisopropyl titanate. The reaction may be initiated by placing the entire reactants into a reactor from the beginning or by adding the reactants portionwise as the reaction proceeds. Lactones, if used, are reacted in the last step with the polyester chain thus produced.

The molar ratios of the reactants and the reaction conditions should be adjusted such that the resulting polyester resin has an acid number from 10 to 100, a hydroxyl number from 30 to 200, a weight average molecular weight from 4,000 to 200,000 and a number average molecular weight from 800 to 10,000.

The polyester resin of the present invention may be dissolved or dispersed in an aqueous medium containing from 0.3 to 1.2 and preferably from 0.5 to 1.0 equivalents of a neutralizing base relative to the acid number of the resin. Examples of neutralizing bases include inorganic bases such alkali metal hydroxides and ammonia, and amines such as methylamine, dimethylamine, trimethylamine, ethylamine, diethylamine, triethylamine, isopropylamine, diisopropylamine, diethylenetriamine, triethylenetetramine, mono-, or diethanolamine, 2-amino-2-methylpropanol, N-methylmorpholine, N-ethylmorpholine, piperazine, dimethylethanolamine, diethylethanolamine and dimethyldodecylamime. Triethylamine, dimethylethanolamine and diethylethanolamine are preferable.

Commonly assigned JP-B-03021227 discloses a method for forming a multilayer coating film including an intermediate or chipping sealer layer of a water-based paint containing finely divided resin particles. The water-based paint of the present invention may also contain finely divided particles of a carboxyl group-containing resin such as carboxyl group-containing acrylic or polyester resins having a particle size from 3 to 60 μm, preferably from 5 to 25 μm and an acid number from 15 to 300, preferably from 30 to 100. Incorporation of the resin particles into the paint formulation contributes not only to rendering the paint high solids but also to increasing the upper limit of film thickness free from sagging owing to a structural viscosity effect. The amount of resin particles is, if added, from 2:98 to 40:60, preferably from 5:95 to 30:70 and more preferably from 10:90 to 25:75 in terms of the weight ratio to the polyester resin of the present invention. Excessive addition of the resin particles will adversely affect the flowability of the paint and, therefore, should be avoided.

The water-based paint of the present invention contains a crosslinker reactive with the polyester resin and also with the resin particles if present. Examples of crosslinkers include epoxy resins, melamine resins, triglycidyl isocyanurate, dicyandiamide and the like. When the polyester resin is alkyd, the paint may contain a dryer such as cobalt naphthenate, lead naphthenate or zinc naphthenate. Melamine resins are preferable. Melamine resins are added at a weight ratio as solids to the polyester resin from 2:8 to 4:6. Typical examples of melamine resins include methylolmelamine produced by the condensation reaction of melamine with formaldehyde, and its derivatives produced by etherifying all or part of methylol groups with a lower alkanol such as methanol, ethanol, n-butanol or isobutanol. An acid catalyst such as p-toluenesulfonic acid, dodecylbenzenesulfonic acid, dinonylnaphthalenesulfonic acid or an amine salt thereof capable of dissociation at the baking temperature of the paint film may be added to the paint.

Blocked polyisocyanates produced by blocking the free isocyanate function of a polyisocyanate with a blocking agent may also be used as a crosslinker. Examples of polyisocyanates include aliphatic diisocyanates such as hexamethylenediisocyanate (HMDI) or trimethylhexamethylenediisocyanate; alicyclic diisocyanate such as isophoronediisocyanate (IPDI); araliphatic diisocyanates such as xylylenediisocyanate (XDI); aromatic diisocyanates such as tolylenediisocyanate (TDI) or 4,4'-diphenylmethanediisocyanate; and dimers, trimers or adducts of these isocyanates with water or a polyhydric alcohol such as trimethylpropane.

Examples of blocking agents include oximes such as methyl ethyl ketoxime, acetoxime, cyclohexanone oxime, acetophenone oxime or benzophenone oxime; phenols such as m-cresol or xylenol; alcohols such as methanol, ethanol, butanol, 2-ethylhexanol, cyclohexanol or ethylene glycol monoethyl ether; lactams such as ε-caprolactam; diketones such as dialkyl malonate or alkyl acetoacetate; and mercaptans such as thiophenol. Diketone (activated methylene) blocked polyisocyanates are preferable. When a blocked polyisocyanate crosslinker is used, a tin compound such as dibutyltin dilaurate is added as a catalyst.

The water-based paint of the present invention may be prepared by dissolving or dispersing the polyester resin in an aqueous medium containing a base to produce an aqueous varnish, and then adding the crosslinker to the varnish. The paint containing the resin particles may be prepared by dissolving or dispersing the polyester resin in an aqueous medium containing the whole amount or a portion of the base to produce an aqueous varnish, adding the resin particles and the remainder of the base, and stirring the mixture under heating. Alternatively, the whole amounts of the polyester resin, the base and the resin particles may be added to the aqueous medium at once followed by stirring the mixture under heating. In this case the amount of a neutralizing base should be sufficient to achieve from 30 to 120%, preferably from 50 to 100% neutralization of the polyester resin and the resin particles. A temperature from 35° C. to 95° C. is preferable when heating the mixture during the stirring step. The resin particles may be dispersed as primary particles in the paint if the above conditions are followed.

Usually the aqueous medium is deionized water. If desired, the aqueous medium may contain a small proportion of a water miscible organic solvent such as diethylene glycol monoethyl ether, diethylene glycol monobutyl ether, propylene glycol monomethyl ether, propylene glycol monoethyl ether, ethylene glycol monomethyl ether, methanol, ethanol, isopropanol, n-butanol, secondary butanol, t-butanol, dimethylformamide and N-methylpyrrolidone.

The water-based paint of the present invention may contain conventional pigments. Examples thereof include coloring or anticorrosive pigments such as titanium dioxide, white lead, zinc white, zinc sulfide, graphite, carbon black, yellow iron oxide, red iron oxide, phthalocyanine blue, phthalocyanine green, quinacridone, indanthrone, isoindolinone, perylene, anthrapyrimidine, benzimidazolone, cadmium yellow, cadmium red, chromium yellow or diketopyrrolopyrrole, and extender pigments such as calcium carbonate, barium sulfate, silica, silicate or aluminum hydroxide. Pigments are added to the paint by milling with a portion of the aqueous varnish of the polyester resin to prepare a pigment paste and then dispersing the paste in the remainder of the aqueous varnish optionally containing the resin particles. The proportion of the pigment in the paint is, when represented as the weight ratio of the pigment to the polyester resin as solids, is generally from 0.01:1 to 1.4:1, preferably from 0.03:1 to 1.2:1.

The water-based paint of the present invention is useful as an intermediate coating for forming a multilayer coating on a metallic substrate. To this end, the paint is applied onto an electrocoating layer previously applied on the substrate before or after baking the electrocoating layer, and then baked independently or simultaneously with the electrocoating layer. Then the intermediate layer is overlaid with a top coating. The waterborne paint of the present invention can be applied on the electrocoating layer to a film thickness sufficient to exhibit satisfactory anti-chipping property without sagging to form a film free from pinholes and other surface defects. Thus, the paint finds use, in particular, in forming a multilayer coating having excellent anti-chipping property and appearance on automobile bodies. The top coating generally comprises a base coat and a clear coat applied thereon. Depending upon the type of pigment contained in the base coat, it is possible for the top coating to be either a solid color finish or a metallic finish. The base coat and clear coat may be either a solvent type or a waterborne type. Preferably the top coating is formed by applying the clear coat on the base coat wet-on-wet and baking both coats simultaneously. This coating method and compositions are well-known in the coating industry and do not constitute a part of the present invention. Therefore, further details will not be required.

The invention is further illustrated by the following examples wherein all parts and % are by weight unless otherwise indicated.

SYNTHESIS EXAMPLE 1

| Material | Parts |
| --- | --- |
| Coconut oil | 147 |
| Trimethylolpropane | 274 |
| 1,4-Cyclohexanedicarboxylic acid | 300 |
| Adipic acid | 64 |
| Dimethylolbutanoic acid | 116 |
| EPOL | 100 |
| ε-Caprolactone | 93 |
| Dibutyltin oxide | 2 |
| Solvesso #150 | 90 |
| Butylcellosolve | 90 |

A reaction vessel equipped with a heating device, stirrer, nitrogen gas tube and distillation device was charged with 147 parts of coconut oil, 274 parts of trimethylolpropane and 2 parts of dibutyltin oxide. The mixture was melted under the nitrogen gas atmosphere by heating. The temperature was gradually raised to 210° C. until a transesterification was completed. After cooling the mixture, 300 parts of 1,4-cyclohexanedicarboxylic acid, 64 parts of adipic acid, 116 parts of dimethylolbutanoic acid and 100 parts of EPOL (hydrogenated polyisoprenediol having an Mn of 1,860 and an average D.P. of 26 sold by Idemitsu Petrochemical Co., Ltd.) were added. Then the mixture was subjected to a dehydration-esterification reaction by raising the temperature gradually to 210° C. until an acid number of 55 was reached. After cooling the mixture to 140° C., 93 parts of ε-caprolactone were added and allowed to react for one hour. The resulting polyester resin #1 was diluted with 90 parts of Solvesso #150 (aromatic hydrocarbon solvent sold by Esso) and 90 parts of butylcellosolve to 85% solids. Hydroxyl number was 150, acid number was 50 and number average Mn (polystyrene standard) was 2,770.

Then Polyester Resin #1 was neutralized at 60° C. with an amount of dimethylethanolamine sufficient to achieve a degree of neutralization of 80% and diluted with deionized water to 40% nonvolatiles to obtain aqueous Polyester Varnish A. The aqueous dispersion was subjected to a storage stability test at 40° C. for 10 days whereupon a good dispersion state was maintained without forming precipitated particles.

SYNTHESIS EXAMPLE 2

| Material | Parts |
| --- | --- |
| Coconut oil | 146 |
| Trimethylolpropane | 272 |
| Isophthalic acid | 193 |
| Adipic acid | 170 |
| Dimethylolpropionic acid | 101 |
| Neopentyl glycol | 18 |
| EPOL | 100 |
| ε-Caprolactone | 92 |
| Dibutyltin oxide | 2 |
| Solvesso #150 | 89 |
| Butylcellosolve | 89 |

Using the above material recipe, Polyester Resin #2 was produced as in Synthesis Example 1 and made up to aqueous Polyester Varnish B shown in Table 2. Properties of the resin and aqueous varnish are shown in Table 1 and Table 2.

SYNTHESIS EXAMPLES 3–5

Polyester Resin #3–#5 and aqueous Polyester Varnish C-E were prepared as in Synthesis Example 1 using the following material recipes. Properties of resins and varnishes are shown in Table 1 and Table 2.

SYNTHESIS EXAMPLE 3

| Material | Parts |
| --- | --- |
| Coconut oil | 147 |
| Trimethylolpropane | 217 |
| 1,4-Cyclohexanedicarboxylic acid | 306 |
| Adipic acid | 65 |
| Dimethylolbutanoic acid | 117 |
| PIP* | 100 |
| ε-Caprolactone | 92 |
| Dibutyltin oxide | 2 |
| Solvesso #150 | 90 |
| Butylcellosolve | 90 |

*Polyisoprenediol having an Mn of 2,400 and an average D.P. of 34 sold by Idemitsu Petrochemical Co., Ltd.

SYNTHESIS EXAMPLES 4–5

| Material | Parts |
| --- | --- |
| Coconut oil | 147 |
| Trimethylolpropane | 273 |
| 1,4-Cyclohexanedicarboxylic acid | 307 |
| Adipic acid | 65 |
| Dimethylolpropionic acid | 100 |
| Polyalkadienediol* | 100 |
| Neopentyl glycol | 8 |

-continued

| Material | Parts |
| --- | --- |
| ε-Caprolactone | 92 |
| Dibutyltin oxide | 2 |
| Solvesso #150 | 90 |
| Butylcellosolve | 90 |

*POLYTEL HA in Synthesis Example 4, hydrogenated polybutadienediol having an Mn of 2,200 and an average D.P. of 39 sold by Mitsubishi Chemical Corporation; POLYTEL H in Synthesis Example 5, hydrogenated polybutadienediol having an Mn of 2,350 and an average D.P. of 42 sold by Mitsubishi Chemical corporation.

SYNTHESIS EXAMPLE 6

| Material | Parts |
| --- | --- |
| Coconut oil | 146 |
| Trimethylolpropane | 271 |
| 1,4-Cyclohexanedicarboxylic acid | 331 |
| Adipic acid | 65 |
| Dimethylolpropionic acid | 60 |
| EPOL | 100 |
| Hexahydrophthalic anhydride | 70 |
| ε-Caprolactone | 92 |
| Dibutyltin oxide | 2 |
| Solvesso #150 | 93 |
| Butylcellsolve | 93 |

Using the above material recipe, Polyester #6 and aqueous Polyester Varnish F were prepared as in Synthesis Example 1. Properties of the resin and varnish are shown in Table 1 and Table 2.

SYNTHESIS EXAMPLE 7 (For Comparison)

| Material | Parts |
| --- | --- |
| Coconut oil | 144 |
| Trimethylolpropane | 340 |
| 1,4-Cyclohexanedicarboxylic acid | 53 |
| Adipic acid | 364 |
| EPOL | 100 |
| Trimellitic anhydride | 40 |
| ε-Caprolactone | 92 |
| Dibutyltin oxide | 2 |
| Solvesso #150 | 90 |
| Butylcellosolve | 90 |

A reaction vessel equipped with a heating device, stirrer, nitrogen gas tube and distillation device was charged with 144 parts of coconut oil, 340 parts of trimethylolpropane and 2 parts of dibutyltin oxide. The mixture was melted under the nitrogen gas atmosphere by heating. The temperature was gradually raised to 210° C. until a transesterification was completed. After cooling the mixture, 53 parts of 1,4-cylohexanedicarboxylic acid, 364 parts of adipic acid, and 100 parts of EPOL were added. Then the mixture was subjected to a dehydration-esterification reaction by raising the temperature gradually to 210° C. and maintaining this temperature until an acid number of 10 was reached. After cooling the mixture to 140° C., 40 parts of trimellitic anhydride were added to the vessel and allowed to react at the same temperature until an acid number of 40 was reached. Then 92 parts of ε-caprolactone were added and allowed to react at 140° C. for one hour. The resulting polyester resin #7 was diluted with 90 parts of Solvesso #150 and 90 parts of butylcellosolve to a solids content of 85%. Hydroxyl number was 135, acid number was 35 and number average Mn (polystyrene standard) was 2,770.

The resulting polyester resin was neutralized at 60° C. with an amount of dimethylethanolamine sufficient to achieve 80% neutralization and dispersed in deionized water to 40% nonvolatiles. The resulting aqueous Varnish G was initially stable but phase separation was observed after storing at 40° C. for 10 days.

TABLE 1

| | Synthesis Example | | | | | | |
| --- | --- | --- | --- | --- | --- | --- | --- |
| | 1 | 2 | 3 | 4 | 5 | 6 | 7 |
| Coconut oil | 147 | 146 | 147 | 147 | 147 | 146 | 144 |
| Trimethylolpropane | 274 | 272 | 217 | 273 | 273 | 271 | 340 |
| 1,4-Cyclohexanedicarboxylic acid | 300 | — | 306 | 307 | 307 | 331 | 53 |
| Isophthalic acid | — | 193 | — | — | — | — | — |
| Adipic acid | 64 | 170 | 65 | 65 | 65 | 65 | 364 |
| Hexahydrophthalic anhydride | — | — | — | — | — | 70 | — |
| Neopentyl glycol | — | 18 | — | 8 | 8 | — | — |
| Dimethylolbutanoic acid | 116 | — | 117 | — | — | — | — |
| Dimethylolpropionic acid | — | 101 | — | 100 | 100 | 60 | — |
| Trimellitic anhydride | — | — | — | — | — | — | 40 |
| Diol* | 100 | 100 | 100 | 100 | 100 | 100 | 100 |
| ε-caprolactone | 93 | 92 | 92 | 92 | 92 | 92 | 92 |
| Dibutyltin oxide | 2 | 2 | 2 | 2 | 2 | 2 | 2 |
| Solvesso #150 | 90 | 90 | 90 | 90 | 90 | 93 | 90 |
| Butylcellosolve | 90 | 90 | 90 | 90 | 90 | 93 | 90 |
| % Diol | 10 | 10 | 10 | 10 | 10 | 10 | 10 |
| Acid #, mgKOH/g | 50 | 35 | 52 | 50 | 50 | 50 | 35 |
| OH#, mgKOH/g | 150 | 164 | 127 | 150 | 150 | 150 | 135 |
| Mn | 2770 | 2870 | 3370 | 2540 | 3050 | 4170 | 2770 |
| Mw | 8000 | 8320 | 9700 | 6930 | 9800 | 9330 | 8000 |
| % Nonvolatiles, | 85 | 85 | 85 | 85 | 85 | 85 | 85 |

*EPOL in Synthesis Ex. 1, 2, 6 and 7; PIP in Synthesis Ex. 3, POLYTEL HA in Synthesis Ex. 4 and POLYTE H if Synthesis Ex. 5

TABLE 2

| | Synthesis Example | | | | | | |
|---|---|---|---|---|---|---|---|
| | 1 | 2 | 3 | 4 | 5 | 6 | 7 |
| Aqueous varnish | A | B | C | D | E | F | G |
| Polyester resin (part as solids) | 100 | 100 | 100 | 100 | 100 | 100 | 100 |
| Dimethylethanolamine (parts) | 6.8 | 4.8 | 6.8 | 6.8 | 6.8 | 6.8 | 4.8 |
| Deionized water (parts) | 105.7 | 107.7 | 105.7 | 105.7 | 105.7 | 105.7 | 105.7 |
| % Neutralization | 80 | 80 | 80 | 80 | 80 | 80 | 80 |
| % Nonbolatiles | 40 | 40 | 40 | 40 | 40 | 40 | 40 |
| Dispersibility | | | | | | | |
| Initial | Good | Good | Good | Good | Good | Good | Good |
| After 10 days at 40° C. | Good | Good | Good | Good | Good | Good | Phase separation |

Examples 1–6 and Comparative Example

Pigment Paste 100 parts of each of Aqueous Polyester Varnish A through G were mixed with 30 parts of deionized water and 130 parts of rutile type titanium dioxide in a container. The mixture was then transferred to a paint conditioner and milled at room temperature for 1 hour with the aid of a glass beads disintegration medium to prepare a pigment paste having a particle size less than 5 μm and a nonvolatile content of 65.4%.

Paint Formulation

Each of Aqueous Polyester Varnish A through G, a pigment paste produced from the same aqueous polyester varnish, hexamethoxymethylolmelamine and p-toluenesulfonic acid were blended in proprotions shown in Table 3. Each paint was diluted with deionized water to 30 second/20° C. of Ford cup #4 and then evaluated its performance according to the following methods. Results are shown in Table 3.

Evalution Method

1) Gloss: The paint was applied on a tinplate and baked at 150° C. for 30 minutes followed by testing the resulting film for the gloss according to JIS K-5400.

2) Pencil hardness: Same as above.

3) Solvent resistance: The film was rubbed with a piece of gauze impregnated with xylene at 10 reciprocations and the appearance of the film was visually observed.

4) Water resistance: A steel plate of 7 cm×15 cm size was spray coated with each of paints of Examples to a dry film thickness of about 35 g m and baked at 150° C. for 30 minutes. The coated plate was then soaked in warmed water at 40° C. for 10 days and the appearance of the film was visually observed. The paint film was also tested for adhesion to the substrate by the grid pattern peeling method according to JIS K-5400. 100/100=all grids adhered; 0/100= all grid peeled.

5) Anti-chipping: A zinc phosphate-treated steel plate of 0.8 mm thickness was coated with a cathodic electrodeposition paint (POWER TOP UP-50, Nippon Paint Co., Ltd.) to a dry film thickness of about 25 μm and then baked at 160° C. for 30 minutes. Then, each of the paints of Examples and Comparative Example was sprayed on the substrate to a dry film thickness of about 35 μm and baked at 150° C. for 30 minutes. Immediately after cooling, the substrate was finished with a top coating by applying a base coat composition (ORGA TO-521, Nippon Paint Co., Ltd.) to a dry film thickness of about 16 μm, applying an acrylic-melamine clear coat composition (ORGA TO-563, Nippon Paint Co., Ltd.) on the base coat wet-on-wet to a dry film thickness of about 40 μm after setting the base coat for about 7 minutes, and finally baking both coats at 140° C. for 20 minutes simultaneously. This specimen was cooled to −30° C. and attached to the specimen holder of a stone-impinging tester (Suga Testing Instruments Co., Ltd.) so that the orientation of the coated surface was at 60° relative to the direction of throwing stones. Then 100 g of crushed stones of No. 7 size were impinged against the specimen at an air pressure of 3 kg/cm². The anti-chipping property was determined depending upon the number and size of damaged areas and represented by the following schedule.

Very good: Substantially no chipped spot is present.

Good: A small number of tinny chipped spots are present.

Poor: Large chipped spots are present in places.

Bad: Large chipped spots are present in the whole area.

6) Pinhole-free thickness limit: The paint was sprayed on a steel plate of 10×30 cm size held in an inclined position to form a thickness gradient having a maximum thickness of 70 μm. After holding in a coating booth horizontally at 25° C. at 70% R.H., the film was baked at 150° C. for 30 minutes. The pinhole-free thickness limit was determined as the maximum thickness below which pinholes were not found in the film.

7) Sagging-free thickness limit: A steel plate of 10 cm×30 cm size was drilled along the axial center line a row of holes of 5 mm diameter. Using this plate, a paint film was formed to have a thickness gradient having a maximum thickness of about 70 μm as in the pinhole-free thickness limit test. After holding in a coating booth vertically at 25° C. at 70% R.H., the film was baked at 150° C. for 30 minutes. The limit was determined as the maximum thickness below which the paint did not sag into the drilled holes.

8) Storage stability: After storing the paint at 40° C. for 10 days, the state of dispersion was visually observed.

TABLE 3

| | Examples | | | | | | Comparative Example |
|---|---|---|---|---|---|---|---|
| | 1 | 2 | 3 | 4 | 5 | 6 | |
| Aqueous varnish | A | B | C | D | E | F | G |
| Parts | 111 | 111 | 111 | 111 | 111 | 111 | 111 |
| Pigment parts, parts | 200 | 200 | 200 | 200 | 200 | 200 | 200 |
| Hexamethoxymethylol-melamine, parts | 25 | 25 | 25 | 25 | 25 | 25 | 25 |
| p-Toluenesulfonic acid, parts | 0.5 | 0.5 | 0.5 | 0.5 | 0.5 | 0.5 | 0.5 |
| Gloss | 85 | 87 | 88 | 89 | 90 | 85 | 85 |
| Pencil hardness | H | 2H | H | H | H | H | HB |
| Solvent resistance | No change | No change | No change | No change | No change | No change | No change |
| Water resistance at 40° C. for 10 days, | | | | | | | |
| Appearance | No change | No change | No change | No change | No change | No change | Whitening |
| Adhesion | 100/100 | 100/100 | 100/100 | 100/100 | 100/100 | 100/100 | 50/100 |
| Anti-chipping | Very good | Very good | Very good | Very good | Very good | Very good | Very good |
| Pinhole-free limit, μm | 60 | 60 | 60 | 60 | 60 | 60 | 60 |
| Sagging-free limit, μm | 55 | 50 | 50 | 50 | 50 | 50 | 40 |
| storage stability, | | | | | | | |
| Initial | Uniform | Uniform | Uniform | Uniform | Uniform | Uniform | Uniform |
| After 10 days at 40° C. | Uniform | Uniform | Uniform | Uniform | Uniform | Uniform | Phase separation |

Example 7

A zinc phosphate-treated steel plate of 0.8 mm thickness was coated with a cathodic electrodeposition paint (POWER TOP PU-50, Nippon Paint Co., Ltd.) to a dry film thickness of about 25 μm, rinsed with water and pre-heated. Then the water-based paint of Example 1 was sprayed thereon wet-on-wet to a dry film thickness of about 35 μm and baked both coats at 150° C. for 30 minutes simultaneously. Thereafter a base coat composition shown below (adjusted to 14 seconds in Fordcup #4) was applied to a dry film thickness of about 15 μm by air spraying in two stages. After standing for 7 minutes, a clear coat composition shown below (adjusted to 20 seconds in Fordcup #4) was applied wet-on-wet to a dry film thickness of about 40 μm by air spraying. After standing for 10 minutes, both coating layers were baked at 140° C. for 30 minutes simultaneously. The resulting maltilayer coating film possessed a gloss greater than 95 and exhibited an excellent finish including flowability and sharpness without any defects such as pinholes and sagging.

| Material | Parts |
|---|---|
| Base coat formulation | |
| ALUPASTE 7160N(aluminum flake paste sold by Toyo Aluminum Co., Ltd., Al flake content 65% | 10.9 |
| ARUMATEX NT-U-448 (thermosetting acrylic varnish sold by Mitsui Toatsu Chemicals, Inc., 48% solids) | 66.9 |
| UVAN 20N-60(melamine resin varnish sold by Mitsui Toatsu Chemicals, Inc., 60% solids) | 13.5 |
| Toluene | 6.4 |
| n-Butanol | 2.0 |
| Triethylamine | 0.5 |
| Clear coat formulation | |
| DAIANAL HR-554(thermosetting acrylic varnish sold Mitsubishi Rayon Co., Ltd., 60% solids) | 58.3 |
| ACR-461(thermosetting acrylic varnish sold be Nippon Paint Co., Ltd., | 63.6 |

-continued

| Material | Parts |
|---|---|
| 55% solids) | |
| UVAN 20N-60 | 50.0 |
| TINUBIN 900 (UV absorber sold by Ciba-Geigy) | 2.0 |
| SANOL LS-292 (light stabilizer sold by Sankyo Yuki Gosei Co., Ltd.) | 1.0 |
| n-Butanol | 1.3 |
| SOLVESSO #100 | 5.0 |

Example 8

Example 7 was followed except that the following water-based base coat composition was replaced for the solvent type base coat composition used in Example 7. The water-based base coat composition (adjusted to 30 seconds in Fordcup #4) was air sprayed to a dry film thickness of about 15 μm in two stages and preheated at 80° C. for 5 minutes before applying the same clear coat composition. The resulting multilayer coating film possessed a gloss greater than 90 and exhibited an excellent finish including flowability and sharpness without any defects such as pinholes and sagging.

| Base coat formulation | |
|---|---|
| Material | Parts |
| ALUPASTS 7160N | 15 |
| CYMEL 303 (melamine resin sold by Mitsui Toatsu Chemicals, Inc.) | 30 |
| PHOSPHOREX A-180L (isostearyl phosphate sold by Sakai Chemical Industry Co., Ltd.) | 2 |
| Aqueous acrylic varnish* | 112 |
| Polyurethane emulsion (33% solids, acid number 16.2) | 43 |

*An aqueous varnish (50% solids) of an acrylic resin having an Mn of 12,000, OH number of 70 and acid number of 58 produced by polymerizing the following monomer mixture.

| Material | Parts |
| --- | --- |
| Ethylene glycol monobutyl ether | 76 |
| styrene | 15 |
| Methyl methacrylate | 63 |
| 2-Hydroxylethyl methacrylate | 48 |
| n-Butyl acrylate | 117 |
| Methacrylic acid | 27 |
| Acrylamide | 30 |
| Azobisbutyronitrile | 3 |
| Dimethylethanolamine | 28 |
| Deionized water | 200 |

What is claimed is:

1. A thermosetting, water-based coating composition comprising:
   (a) a polyester resin having an acid number from 10 to 100, a hydroxyl number from 30 to 200 and a weight average molecular weight from 4,000 to 200,000 and containing a polyalkadienediol having an average degree of polymerization from 5 to 50, a hydrogenate product of said polyalkadienediol or a mixture thereof in a proportion from 1 to 40% by weight of the entire polyester-forming reactants, and a 2,2-bis(hydroxymethyl)alkanoic acid having 3 or more carbon atoms in the main chain in a proportion from 2 to 50% by weight of the entire polyester-forming reactants, and
   (b) a crosslinker for said polyester resin, said polyester resin and said crosslinker being dispersed in an aqueous medium containing a neutralizing base.

2. The coating composition according to claim 1 wherein said polyalkadienediol is a polyisoprenediol or polybutadienediol having a number average molecular weight from 1,000 to 4,000.

3. The coating composition according to claim 1 wherein said 2,2-bis(hydroxymethyl)alkanoic acid is 2,2-dimethylolpropionic acid or 2,2-dimethylolbutanoic acid.

4. The coating composition according to claim 1 wherein said polyester resin contains an alicyclic polycarboxylic acid in a proportion up to 50% by weight of the entire polyester-forming reactants.

5. The coating composition according to claim 4 wherein said alicyclic polycarboxylic acid is 1,4-cyclohexanedicarboxylic acid.

6. The coating composition according to claim 1 wherein said polyester resin contains a lactone addition-reacted thereto in a proportion from 3 to 30% by weight of the entire polyester-forming reactants including said lactone.

7. The coating composition according to claim 6 wherein said lactone is ε-caprolactone.

8. The coating composition according to claim 1 wherein said polyester resin is an alkyd resin further containing a fatty acid having 6 or more carbon atoms or an oil containing said fatty acid in a proportion up to 30% by weight of the entire polyester-forming reactants.

9. The coating composition according to claim 1 wherein said crosslinker is a melamine resin or a blocked polyisocyanate.

10. In a method for forming a multilayer coating film on a metallic substrate comprising the steps of applying onto said substrate an electrodeposition coating layer, an intermediate coating layer and a top coating layer successively, the improvement wherein said intermediate coating layer consists of the water-based polyester coating composition of claim 1.

11. The method according to claim 10 wherein said water-based polyester coating composition is applied on said electrodeposition coating layer wet-on-wet and the coating film so applied is baked simultaneously with said electrodeposition coating layer.

12. The method according to claim 10 wherein said substrate is an automobile body.

13. The coating composition according to claim 1, wherein the proportion of 2,2-bis(hydroxymethyl)alkanoic acid is 5 to 20% by weight of the entire polyester-forming reactants.

14. The coating composition according to claim 1, wherein the alkanoic acid of the 2,2-bis(hydroxymethyl)alkanoic acid has 3 to 18 carbon atoms.

15. The coating composition according to claim 1, wherein the crosslinker is an epoxy resin, a melamine resin, trigylcidyl isocyanurate or dicyanamide.

16. The composition according to claim 1, wherein the crosslinker is a melamine resin which is provided in a weight ratio as solids to the polyester resin of 2:8 to 4:6.

* * * * *